(12) United States Patent
Kuroda

(10) Patent No.: US 8,660,755 B2
(45) Date of Patent: Feb. 25, 2014

(54) ELECTRIC POWER STEERING SYSTEM

(75) Inventor: Yoshihide Kuroda, Obu (JP)

(73) Assignee: Denso Corporation, Kariya (JP)

( * ) Notice: Subject to any disclaimer, the term of this patent is extended or adjusted under 35 U.S.C. 154(b) by 26 days.

(21) Appl. No.: 13/607,851

(22) Filed: Sep. 10, 2012

(65) Prior Publication Data

US 2013/0090809 A1    Apr. 11, 2013

(30) Foreign Application Priority Data

Oct. 5, 2011    (JP) .................................. 2011-220826

(51) Int. Cl.
*B60R 16/027*    (2006.01)
(52) U.S. Cl.
USPC ............. 701/43; 701/41; 701/29.1; 701/29.2; 701/29.6; 180/443; 180/444

(58) Field of Classification Search
None
See application file for complete search history.

(56) References Cited

FOREIGN PATENT DOCUMENTS

| JP | 2003-182598 | 7/2003 |
|---|---|---|
| JP | 2009-248885 | 10/2009 |

*Primary Examiner* — Thomas Tarcza
*Assistant Examiner* — Richard Goldman
(74) *Attorney, Agent, or Firm* — Nixon & Vanderhye PC

(57) ABSTRACT

A power relay is provided in a power line, which supplies power from a power source to a motor through an inverter circuit, to shut off power supply from the power source to the inverter circuit when an abnormality arises. A microcomputer diagnoses a short-circuit failure of the power relay when a steering wheel is not steered during a normal control operation of assisting the steering operation of the steering wheel. An EPS shuts off power supply by the power relay when the steering wheel is not steered, so that the short-circuit failure of the power relay is diagnosed without affecting the assist operation for the steering wheel.

7 Claims, 4 Drawing Sheets

ELECTRIC POWER STEERING SYSTEM

CROSS REFERENCE TO RELATED APPLICATION

This application relates to and incorporates herein by reference Japanese patent application No. 2011-220826 filed on Oct. 5, 2011.

TECHNICAL FIELD

The present disclosure relates to an electric power steering system for a vehicle.

BACKGROUND ART

A conventional electric power steering system (EPS) assists a steering operation of a steering wheel in a vehicle by drive force of a motor as disclosed in the following patent documents.
[Patent document 1] JP 2003-182598A
[Patent document 2] JP 2009-248885A In the EPS disclosed in patent document 1, a failure diagnosis is performed to check whether a power relay, a motor relay and a motor drive circuit are operable normally before starting a normal control operation for assisting a steering operation of a steering wheel in a vehicle after an ignition switch is turned on. In the EPS disclosed in patent document 2, a diagnosis is performed to check whether a power relay has a short-circuit failure during a normal control operation by supplying a motor with electric power from an auxiliary power source provided in a circuit, which supplies power to the motor, without through the power relay.

According to the EPS of patent document 1, however, when the failure diagnosis for the power relay or the motor relay is performed in the normal control operation, it becomes impossible to supply power to the motor and assist the steering operation of the steering wheel. For this reason, the failure diagnosis is not performed during the normal control operation. According to the EPS of patent document 2, the auxiliary power source and the power circuit are provided additionally to perform the failure diagnosis of the power relay. As a result, the EPS becomes large in physical size, the number of parts increases and a manufacturing cost increases.

SUMMARY

It is therefore an object to provide an electric power steering system for a vehicle, which performs a diagnosis operation about a short-circuit failure of a power shut-off circuit during a normal control operation of assisting a steering operation of a steering wheel.

According to a first aspect, an electric power steering system includes a motor, a motor drive circuit, a power shut-off circuit and a control unit. The motor assists a steering operation of a steering wheel. The motor drive circuit supplies the motor with drive currents for driving the motor by converting a current supplied from a power source to the drive currents. The power shut-off circuit is provided in a power line extending from the power source to supply the drive currents to the motor through the motor drive circuit. The power shut-off circuit shuts off power supply from the power source to the motor drive circuit or from the motor drive circuit to the motor when an abnormality arises. The control unit controls power supply to the motor by controlling the motor drive circuit.

The control unit includes a state detection section, a steering detection section and a failure diagnosis section. The state detection section detects that the control unit is in a normal control operation state for controlling the power supply to the motor by controlling the motor drive circuits after an ignition switch is turned on. The steering detection section detects an amount of the steering operation of the steering wheel. The failure diagnosis section diagnoses a short-circuit failure of the power shut-off circuit, when the state detection section detects that the control unit is in the normal control operation state and the steering detection section detects that a detected amount of the steering operation is less than a predetermined amount.

According to a second aspect, an electric power steering system for a vehicle has a similar configuration as in the first aspect. However, a motor drive circuit is formed of a first motor drive circuit and a second motor drive circuit, and a power shut-off circuit is formed of a first power shut-off circuit and a second power shut-off circuit.

In the control unit, the state detection section detects that the control unit is in a normal control operation state for controlling the power supply to the motor by controlling the first motor drive circuit and the second motor drive circuit after an ignition switch is turned on. The failure diagnosis section diagnoses alternately a short-circuit failure of the first power shut-off circuit and the second power shut-off circuit, when the state detection section detects that the control unit is in the normal control operation state. The control unit controls the power supply to the motor by the second motor drive circuit, which is not subjected to the failure diagnosis by the failure diagnosis section, when the failure diagnosis section diagnoses the failure of the first power shut-off circuit. The control unit controls the power supply to the motor by the first motor drive circuit, which is not subjected to the failure diagnosis, when the failure diagnosis section diagnoses the failure of the second power shut-off circuit.

DETAILED DESCRIPTION OF THE EMBODIMENT

Embodiments of an electric power steering system will be described below with reference to the drawings.

First Embodiment

Figure 1:
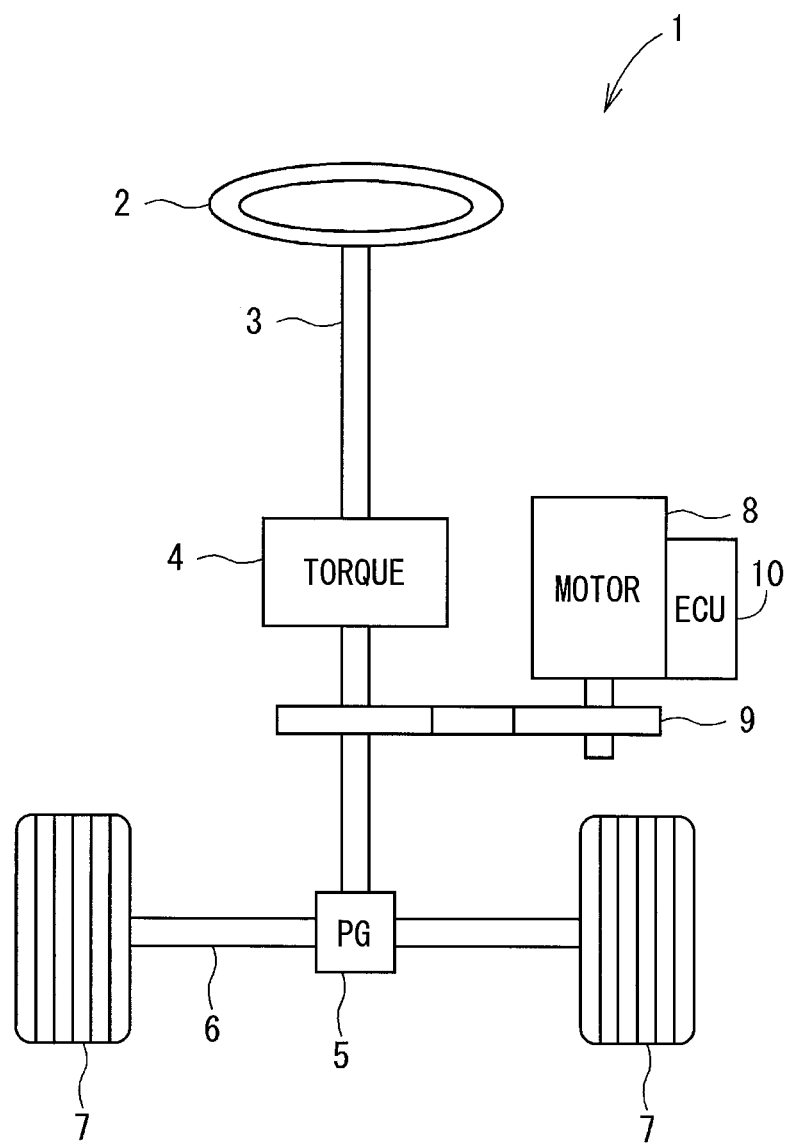
FIG. 1 is a schematic diagram of an electric power steering system according to a first embodiment.

Referring to FIG. 1, an electric power steering system (EPS) 1 is provided in a vehicle, which has a steering wheel 2, a steering shaft 3, a pinion gear 5, a rack shaft 6 and a pair of tire wheels 7. A torque sensor 4 is attached to the steering shaft 3 coupled to the steering wheel 2 for detecting a steering torque. At a top end of the steering shaft 3, the pinion gear 5 is provided. The pinion gear 5 is meshed with the rack shaft 6. At both ends of the rack shaft 6, the tire wheels 7 are rotatably coupled through tie rods and the like. Thus the rotary motion of the steering shaft 3 is converted to the linear motion of the rack shaft 6 by the pinion gear 5. The tire wheels 7 are steered by an angle corresponding to a linear movement of the rack shaft 6. The EPS 1 is formed of an electric motor 8, a reduction gear 9 and an electronic control unit (ECU) 10, which controls driving of the motor 8. The motor 8 is a three-phase brushless motor and generates assist torque for power-assisting a steering operation of the steering wheel 2. This assist torque is transferred to the steering shaft 3 through the reduction gear 9.

Figure 2:
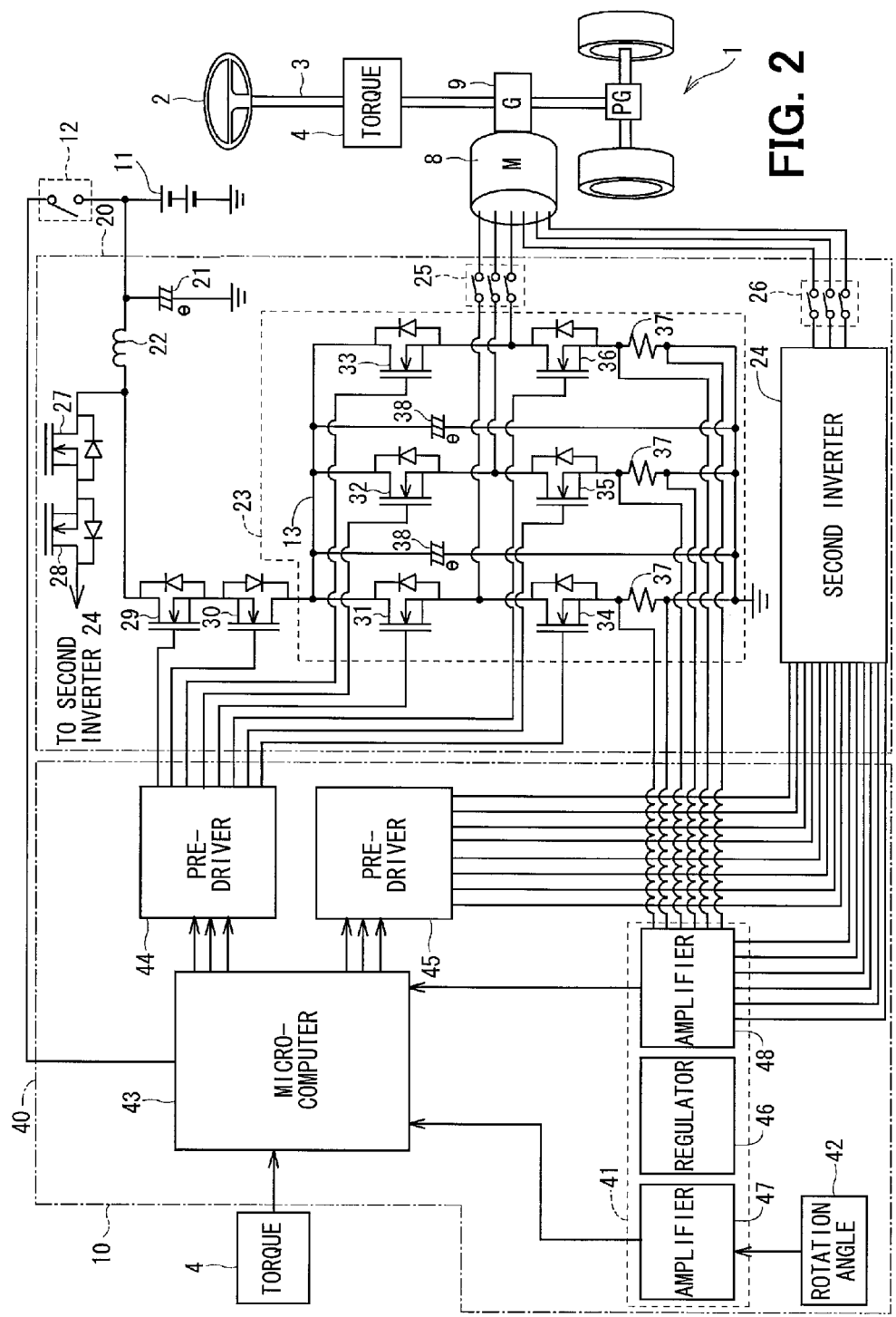
FIG. 2 is a circuit diagram of the electric power steering system according to the first embodiment.

The ECU 10 is configured as shown in FIG. 2. The ECU 10 includes a power circuit 20 and a control circuit 40. The ECU 10 controls driving of the motor 8. The power circuit 20 of the ECU 10 includes a first capacitor 21, a choke coil 22, a plurality of power modules and the like.

Electric power is supplied to the power circuit 20 from a power source (DC battery) 11 provided outside the ECU 10. The first capacitor 21 and the choke coil 22 provided in the power circuit 20 form a filter circuit to reduce noises transmitted from external units to the ECU 10 and noises transmitted from the ECU 10 to other units, which share the same power source 11. The choke coil 22 is connected in series between the power source 11 and power relays 27, 29.

The power circuit 20 includes two power modules. A first power module is formed by covering or molding the first power relays 29, 30, switching elements 31 to 36 of a first inverter circuit 23, a first motor relay 25, shunt resistors 37 and the like with a sealing material such as resin. The power relays 29, 30 are MOSFETs, which are field-effect transistors. The power relays 29, 30 are provided in series between the switching elements 31 to 36 and the choke coil 22 and are capable of shutting off currents, which flow to the motor 8 through the switching elements 31 to 36, when abnormality arises.

The switching elements 31 to 36 are also MOSFETs as the power relays 29, 30. The switching elements 31 to 36 are each on/off-controlled by a gate voltage between a source and a drain. The three switching elements 31 to 33 at a power source side (high-potential side) has drains connected to the power source side and sources connected to drains of the three switching elements 34 to 36, which are at a ground side (low-potential side) and correspond to the switching elements 31 to 33, respectively. The switching elements 34 to 36 at the ground side have sources connected to the ground through shunt resistors 37, respectively. Junctions between the switching elements 31 to 33 and the paired switching elements 34 and 36 are connected to three phase coils of the motor 8, respectively.

The motor relay 25 is also a MOSFET as the power relays 29, 30 are. The motor relay 25 is provided between the junctions and the three phase coils of the motor 8 and capable of shutting off currents, which flow from the inverter circuit 23 to the motor 8, when abnormality arises in the first module. The power relays 29, 30 and the motor relay 25 form a first power shut-off circuit.

The shunt resistors 37 are connected between the switching elements 34 to 36 and the ground, respectively. Drive currents flowing to the motor 8 are detectable by detecting voltages or currents applied to the shunt resistors 37. Second capacitors 38 are connected to a first power line 13 of the power source sides of the switching elements 31 to 33 and to a first ground line of the ground side of the same. The second capacitors 38 are thus connected in parallel to the switching elements 31 to 36. The second capacitors 38 store electric charge therein and assist power supply to the switching elements 31 to 36. Further the capacitors 28 absorb ripple currents generated when the current supply is switched over.

The second inverter circuit 24 included in the second power module is supplied with power from a second power line branched from the choke coil 22. The second power module has the same circuit configuration as the first power module described above and hence no detailed description will be made. Second power relays 27, 28 and a second motor relay 26 form a second power shut-off circuit.

The control circuit 40 is formed of a customized IC 41, a rotation angle sensor 42, a microcomputer 43, pre-drivers 44, 45 and the like. The customized IC 41 is a semiconductor integrated circuit, which includes a regulator 46, a rotation angle sensor signal amplifier 47 and a detection voltage amplifier 48. The regulator 46 is a stabilizer circuit for stabilizing power supplied from the power source 11. The regulator 46 stabilizes power supplied to each part in the control circuit 40. When an ignition switch 12 provided in a power circuit of the control circuit 40 is turned on, power is supplied from the power source 11 to the microcomputer 43 through the regulator 46 The microcomputer 43 thus is operable with a stabilized predetermined voltage (for example, 5V)

A rotation angle signal of the rotation angle sensor 42 is applied to the signal amplifier 47. The rotation angle sensor 42 is provided in a magnetic field of magnets provided on the shaft of the motor 58 and detects a change in the surrounding magnetic field. The detected value is transmitted to the signal amplifier 47 as a signal related to the rotational angle of the motor 8. The signal amplifier 47 amplifies a signal related to the rotational speed of the motor 8 and transmitted from the rotation angle sensor 42, and outputs it to the microcomputer 43. The microcomputer 43 is capable of detecting an angular velocity of the motor. The microcomputer 43 and the rotation angle sensor 42 correspond to angular velocity detection section. A differential voltage amplifier 48 detects voltages developed between both terminals of the shunt resistors 37, amplifies the detected voltages and outputs the same to the microcomputer 43.

The microcomputer 43 is a small-sized computer, which includes a CPU as an arithmetic operation unit, a ROM and a RAM as storage units. The microcomputer 43 is configured to perform various processing by the CPU in accordance with a variety of programs stored in the ROM. The microcomputer 43 is a control unit, which operates as a state detection section or a failure diagnosis section.

The microcomputer 43 receives the signal related to a rotation angle of the motor 8 from the rotation angle sensor signal amplifier 47, the voltages of the shunt resistors 37 from the detection voltage amplifier 48, the steering torque signal from the torque sensor 4, vehicle speed information from CAN, and the like. The microcomputer 43 controls the inverter circuits 23, 24 through pre-drivers 44, 45 based on the rotation angle of the motor 8, when the above-described signals are applied. The microcomputer 43 further controls the inverter circuits 23, 24 to approximate the currents supplied to the motor 8 in accordance with the voltages of the shunt resistors 37 inputted from the detection voltage amplifier 48.

According to the first embodiment, the ECU 10 includes two systems of motor drive circuits. The microcomputer 43 controls one inverter circuit 23 through one pre-driver 44, and similarly controls the other inverter circuit 24 through the other pre-driver 45. The pre-driver 44 and the inverter circuit 23 correspond to a first motor drive circuit. The pre-driver 45 and the inverter circuit 24 correspond to a second motor drive circuit.

The microcomputer 43 generates pulse signals through the pre-drivers 44, 45 to assist the steering operation of the steering wheel 2 in accordance with the vehicle speed. The pulse signals are formed by a PWM control operation based on the output signals supplied from the rotation angle sensor 42, the torque sensor 4 and the shunt resistors 37 as well as the vehicle speed information supplied from the CAN. The pulse signals control on-off switching operations of the switching elements of the two inverter circuits 23, 24. Thus, the motor 8 is supplied with drive currents, which are both in sinusoidal waveforms and different in phase from each other, and stator coils of the motor 8 generate a rotating magnetic field. The motor 8 generates a rotating force by the rotating magnetic field and power-assists a driver's steering operation of the steering wheel 2.

Figure 3:
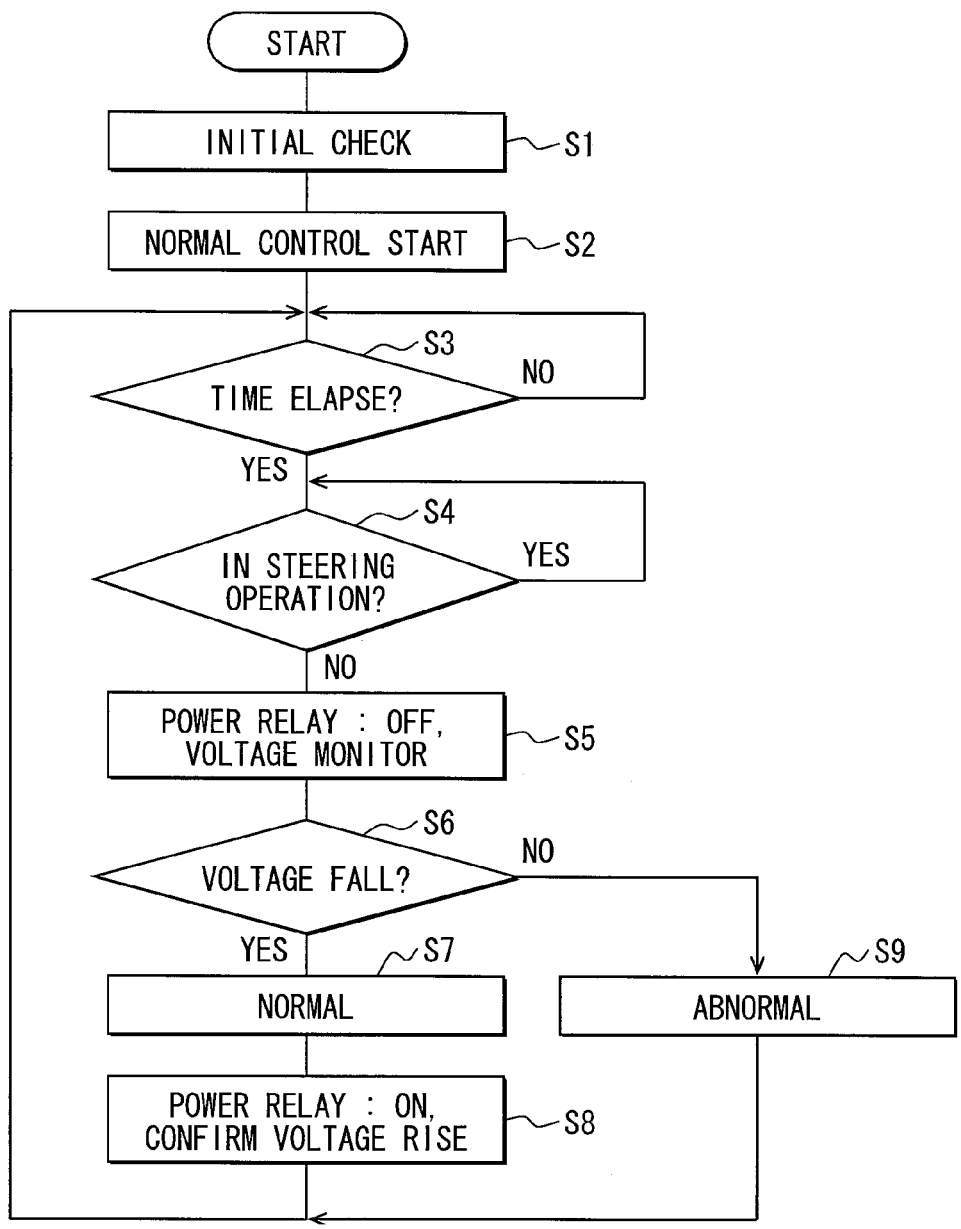
FIG. 3 is a flowchart of a failure diagnosis operation of the electric power steering system according to the first embodiment.

A failure diagnosis operation performed by the microcomputer 43 in the EPS 1 will be described with reference to a flowchart shown in FIG. 3. It is assumed here that the power relays 29, 30 form one power relay.

This processing is started when the ignition switch 12 of the vehicle is turned on. At step S1 (step is simply referred to as S below), an initial check is performed. In the initial check, failure detection is performed with respect to the power relays 27 to 30, the switching elements 31 to 36, the shunt resistors 37, the motor relays 25, 26 and the like. When the initial check is finished, the microcomputer 43 starts a power supply control operation for the motor 8 by controlling the switching elements 31 to 36 of the inverter circuits 23, 24 in the two systems through the pre-drivers 44, 45 (S2). The microcomputer 43 detects at this time that the processing state of the CPU indicates a completion of the initial check and a transition to normal motor control for controlling power supply to the motor 8.

When a predetermined time elapses after the microcomputer 43 started the power supply control (S3: YES), failure diagnosis processing is started. In the failure diagnosis processing, it is first checked at S4 whether the steering wheel 2 is in a steering operation. The steering operation of the steering wheel 2 may be detected by detecting a change in the torque of the steering shaft 3 detected by the torque sensor 4 or the angular velocity of the motor 8 detected by the rotation angle sensor 42. It is also possible to detect it based on both of the output signals of the torque sensor 4 and the rotation angle sensor 42. If it is detected that the steering wheel 2 is in the steering operation (S4: YES), the failure diagnosis processing is not started. If it is detected that the steering wheel 2 is not in the steering operation (S4: NO), the failure diagnosis processing is performed. It is possible to determine that the steering wheel 2 is not in the steering operation if the steering wheel 2 is operated only slightly within a range of play.

The microcomputer 43 outputs signals to turn off the power relays 29, 30 for shut-off of power supply from the power source 11 to the inverter circuit 23 and monitors the voltage of the power line 13, which connects the switching elements 31 to 33 at the power relay side and the power relays 29, 30. If the voltage of the power line 13 falls (S6: YES), the power relays 29, 30 are assumed to be operating normally to shut off the power supply. That is, the power relays 29, 30 have no short-circuit failure therein. In this case, the power relays 29, 30 are determined to be "normal" (S7). The microcomputer 43 outputs signals to turn on the power relays 29, 30 for power supply and confirms a rise of the voltage of the power line 13 of the inverter circuit 23 (S8).

When the voltage of the power line 13 of the inverter circuit 23 does not fall although the microcomputer 43 outputs the signals to turn off the power relays 29, 30 for shut-off of power supply (S6: NO), it is likely that the power relays 29, 30 have a short-circuit failure. In this case, the power relays 29, 30 are determined to be "abnormal" (S9). A warning light may be activated to provide a caution to a driver. In this case, the normal control of the motor 8 may be prohibited, because the power relays 29, 30 are assumed to be short-circuited, that is, persistently turned on.

The failure diagnosis processing is performed persistently by repeating the series of processing from S3 to S8 or S9 during the normal control operation for the motor 8 by the microcomputer 43. In the failure diagnosis about the power relays 27 to 30, the failure diagnosis about the power relays 29, 30 of the inverter circuit 23 and the failure diagnosis about the power relays 27, 28 of the inverter circuit 24 may be performed at the same time. In the failure diagnosis about the power relays 27 to 30, however, the failure diagnosis about the power relays 29, 30 of the inverter circuit 23 and the failure diagnosis about the power relays 27, 28 of the inverter circuit 24 may be performed alternately.

According to the first embodiment, the failure diagnosis about the power relays 27 to 30 is performed when the microcomputer 43 is in the normal control state of normally controlling the motor 8 and the steering wheel 2 is not being steered. The EPS 1 can perform diagnosis of the short-circuit failure of the power relays 27 to 30 by driving the power relays 27 to 30 to shut off power supply without affecting the assist operation for the steering operation of the steering wheel 2. As a result, by checking the short-circuit failure in the power relays 27 to 30 even in the normal control time in addition to the initial check, the reliability of operation of the power relays 27 to 30 at the occurrence of abnormality can be enhanced. According to the first embodiment, arithmetic operation load of the microcomputer 43 can be reduced by performing the failure diagnosis of the power relays 27 to 30 periodically during the normal control operation.

Second Embodiment

Figure 4:
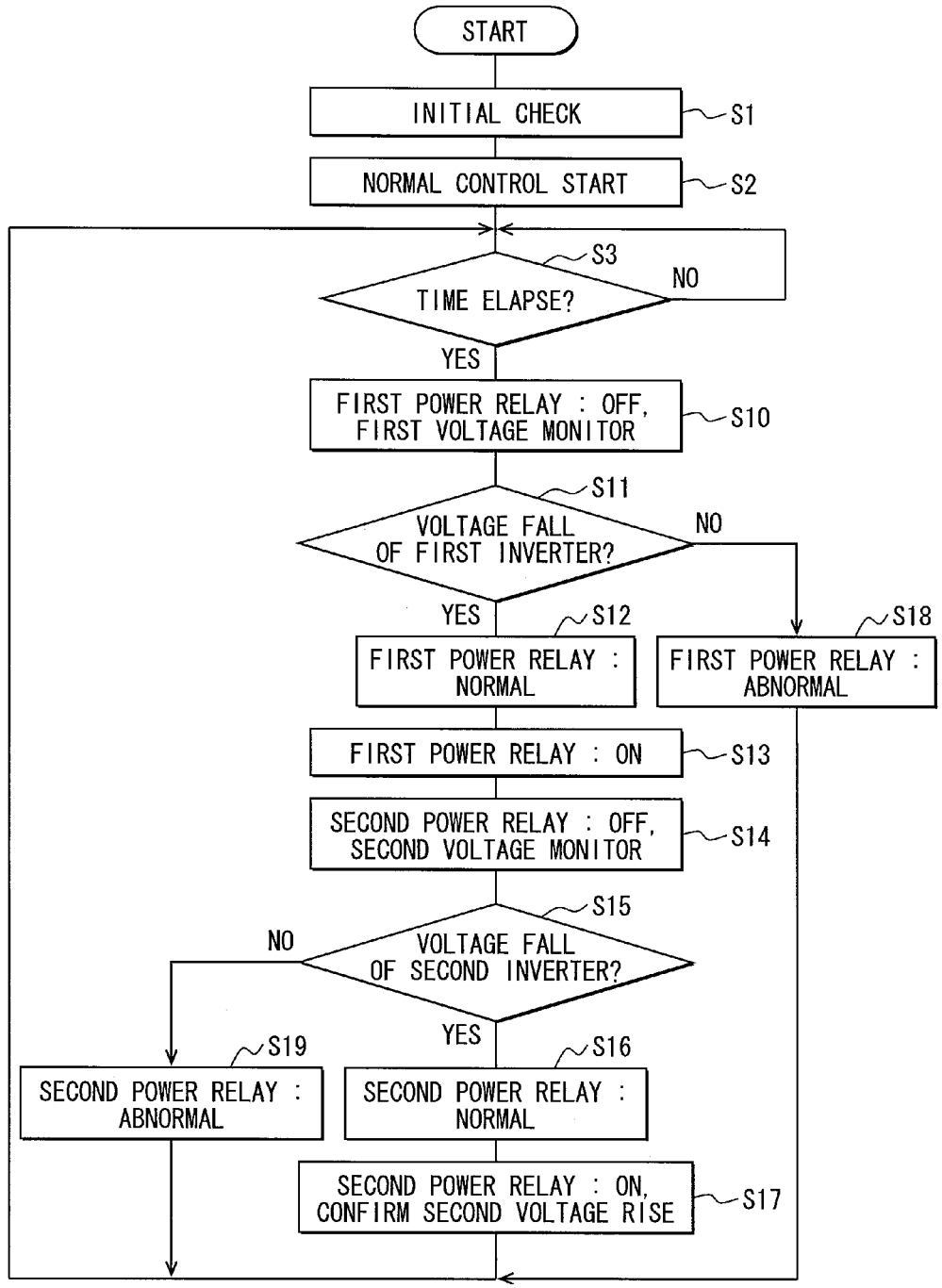
FIG. 4 is a flowchart of a failure diagnosis operation of an electric power steering system according to a second embodiment.

A failure diagnosis operation performed by an EPS according to a second embodiment will be described with reference to a flowchart shown in FIG. 4. In the second embodiment, the same or similar parts as in the first embodiment are designated by the same or similar reference numerals to simplify the description.

According to the second embodiment, the power relays 29, 30 and the inverter circuit 23, which are provided in the first power module, are referred to as the first power relays 29, 30 and the first inverter circuit 23, respectively. The power relays 27, 28 and the inverter circuit 24, which are provided in the second power module, are referred to as the second power relays 27, 28 and the second inverter circuit 24, respectively.

S1 to S3 are the same as in the first embodiment. When a predetermined time elapses after the microcomputer 43 started the power supply control (S3: YES), failure diagnosis processing is started. In the failure diagnosis processing, first at S10, the microcomputer 43 outputs signals to turn off the first power relays 29, 30 for shut-off of power supply and monitors the voltage of the first power line 13 of the first inverter circuit 23, which connects the switching elements 31 to 33 at the first power relay side and the first power relays 29, 30. At this time, the microcomputer 43 increases currents supplied from the second inverter circuit 24 to the motor 8 to supplement the insufficiency of currents supplied from the first inverter circuit 23. Thus, the assist torque of the motor 8 is maintained when the power supply from the first inverter circuit 23 to the motor 8 is shut off.

If the voltage of the power line 13 of the first inverter circuit 23 falls (S11: YES), the first power relays 29, 30 are assumed to be operable normally to shut off the power supply. That is, the first power relays 29, 30 have no short-circuit failure therein. In this case, the first power relays 29, 30 are determined to be "normal" (S12). The microcomputer 43 outputs signals to turn on the first power relays 29, 30 for power supply and confirms a rise of the voltage of the power line 13 of the first inverter circuit 23 (S13).

When the voltage of the power line 13 of the first inverter circuit 23 does not fall although the microcomputer 43 outputs the signals to turn off the first power relays 29, 30 for shut-off of power supply (S11: NO), it is likely that the first power relays 29, 30 have a short-circuit failure. In this case, the first power relays 29, 30 are determined to be "abnormal" (S18). A warning light may be activated to provide a caution to a driver. In this case, the normal control of the motor 8 by the first inverter circuit 23 may be prohibited.

After confirming that the first power relays 29, 30 are turned on and the voltage of the power line 13 of the first inverter circuit 23 is normal, the microcomputer 43 outputs signals to turn off the second power relays 27, 28 for shut-off of power supply. The microcomputer 43 monitors a voltage of a second power line of the second inverter circuit 24, which connects the switching elements at the second power relay side and the second power relays 27, 28. At this time, the microcomputer 43 increases currents supplied from the first inverter circuit 23 to the motor 8. Thus, the assist torque of the motor 8 is maintained without decreasing when the power supply from the second inverter circuit 24 to the motor 8 is shut off. If the voltage of the second power line of the second inverter circuit 24 falls (S15: YES), the second power relays 29, 30 are assumed to be operating normally to shut off the power supply. That is, the second power relays 27, 28 have no short-circuit failure therein. In this case, the second power relays 27, 28 are determined to be "normal" (S16). The microcomputer 43 outputs signals to turn on the second power relays 27, 28 for power supply and confirms a rise of the voltage of the second power line of the second inverter circuit 24 (S17).

When the voltage of the second power line of the second inverter circuit 24 does not fall although the microcomputer 43 outputs the signals to turn off the second power relays 27, 28 for shut-off of power supply (S15: NO), it is likely that the second power relay 27, 28 have a short-circuit failure. In this case, the second power relays 27, 28 are determined to be "abnormal" (S19). A warning light may be activated to provide a caution to a driver. In this case, the normal control of the motor 8 by the second inverter circuit 23 may be prohibited.

The failure diagnosis processing is performed persistently by repeating the series of processing, which includes S3 and from S10 to S19, during the normal control operation for the motor 8 by the microcomputer 43.

According to the second embodiment, the failure diagnosis about the first power relays 29, 30 and the failure diagnosis about the second power relays 27, 28 are performed alternately when the microcomputer 43 is in the normal control state of normally controlling the motor 8. The EPS can thus perform diagnosis of the short-circuit failure of the first and the second power relays 27 to 30 by driving the first and the second power relays 27 to 30 to shut off power supply without affecting the assist operation for the steering operation of the steering wheel 2.

According to the second embodiment, the amount of currents supplied from the second inverter circuit 24 to the motor 8 is increased when the failure diagnosis about the first power relays 29, 30 is performed. Similarly, the amount of currents supplied from the first inverter circuit 23 to the motor 8 is increased when the failure diagnosis about the second power relays 27, 28 is performed. Since the motor 8 is thus supplied with power from either the first inverter circuit 23 or the second inverter circuit 24, which is not subjected to the failure diagnosis, the motor 8 can maintain its assist torque and surely assist the steering operation of the steering wheel 2.

Other Embodiments

According to the first embodiment described above, the failure diagnosis operation is performed when it is detected at S4 that the steering wheel 2 is not being steered. However, as another embodiment, it is possible to perform the failure diagnosis when the amount of the steering operation of the steering wheel 2 detected by the torque sensor 4 and the rotation angle sensor 42 is less than a predetermined operation amount, for example, when the detected steering operation amount does not exceed the amount of play of the steering wheel 2.

According to the above-described embodiments, the EPS is assumed to have two systems of inverter circuits 23, 24. However, as another embodiment, it is possible to perform the failure diagnosis of the first embodiment in an EPS having only one or as many as three or more number of systems of inverter circuits. Further, it is possible to perform the failure diagnosis of the second embodiment in an EPS having three or more number of systems of inverter circuits. In the above-described embodiments, the diagnosis is performed about the short-circuit failure of the power relays 27 to 30 during the normal control operation. However, as another embodiment, the diagnosis may be performed about the short-circuit failure of the motor relays 25, 26 provided between the inverter circuits 23, 24 and the motor 8 during the normal control operation. In this case, the microcomputer 43 outputs signals to turn off the motor relays 25, 26 for power supply shut-off and monitors a voltage of a power line, which connects the motor relays 25, 26 and the motor 8. If the voltage of the power line falls, the motor relays 25, 26 are assumed to have no short-circuit failure therein. If the voltage of the wire does not fall, the motor relays 25, 26 are likely to have the short-circuit failure.

The EPS is not limited to the above-described embodiments but may be implemented by combining the above-described embodiments and in different embodiments.

What is claimed is:

1. An electric power steering system comprising:
a motor for assisting a steering operation of a steering wheel;
a motor drive circuit for supplying the motor with drive currents for driving the motor by converting a current supplied from a power source to the drive currents;
a power shut-off circuit provided in a power line extending from the power source to supply the drive currents to the motor through the motor drive circuit, the power shut-off circuit shutting off power supply from the power source to the motor drive circuit or from the motor drive circuit to the motor when an abnormality arises; and
a control unit for controlling power supply to the motor by controlling the motor drive circuit,
wherein the control unit includes a state detection section, a steering detection section and a failure diagnosis section,
the state detection section detecting that the control unit is in a normal control operation state for controlling the power supply to the motor by controlling the motor drive circuits after an ignition switch is turned on,
the steering detection section detecting an amount of the steering operation of the steering wheel, and
the failure diagnosis section diagnosing a short-circuit failure of the power shut-off circuit, when the state detection section detects that the control unit is in the normal control operation state and the steering detection section detects that a detected amount of the steering operation is less than a predetermined amount.

2. The electric power steering system according to claim 1, wherein:
the failure diagnosis section diagnoses the short-circuit failure of the power shut-off circuit by shutting off the power supply through the power shut-off circuit and monitoring a voltage of the power line between the power shut-off circuit and the motor.

3. The electric power steering system according to claim 1, wherein:
the steering detection sensor detects the amount of the steering operation of the steering wheel based on at least one of a change in a torque of a steering shaft coupled to the steering wheel, and an angular velocity of the motor.

4. The electric power steering system according to claim 1, wherein:
the failure diagnosis section performs the failure diagnosis at a predetermined time interval.

5. An electric power steering system for a vehicle comprising:
a motor for assisting a steering operation of a steering wheel;
a first motor drive circuit and a second motor drive circuit for supplying the motor with drive currents for driving the motor by converting a current supplied from a power source to the drive currents;
a first power shut-off circuit provided in a first power line extending from the power source to supply the drive currents to the motor through the first motor drive circuit, the first power shut-off circuit shutting off power supply from the power source to the first motor drive circuit or from the first motor drive circuit to the motor when an abnormality arises;
a second power shut-off circuit provided in a second power line extending from the power source to supply the drive current to the motor through the second motor drive circuit, the second power shut-off circuit shutting off power supply from the power source to the second motor drive circuit or from the second motor drive circuit to the motor when an abnormality arises; and
a control unit for controlling the power supply to the motor by controlling the first motor drive circuit and the second motor drive circuit,
wherein the control unit includes a state detection section and a failure detection section,
the state detection section detecting that the control unit is in a normal control operation state for controlling the power supply to the motor by controlling the first motor drive circuit and the second motor drive circuit after an ignition switch is turned on, and
the failure diagnosis section diagnosing alternately a short-circuit failure of the first power shut-off circuit and the second power shut-off circuit, when the state detection section detects that the control unit is in the normal control operation state,
wherein the control unit controls the power supply to the motor by the second motor drive circuit, which is not subjected to the failure diagnosis by the failure diagnosis section, when the failure diagnosis section diagnoses the failure of the first power shut-off circuit, and
wherein the control unit controls the power supply to the motor by the first motor drive circuit, which is not subjected to the failure diagnosis, when the failure diagnosis section diagnoses the failure of the second power shut-off circuit.

6. The electric power steering system according to claim 5, wherein:
an amount of the drive currents supplied to the motor from the second motor drive circuit, which is not subjected to the failure diagnosis, is increased when the first power shut-off circuit is subjected to the failure diagnosis; and
an amount of the drive currents supplied to the motor from the first motor drive circuit, which is not subjected to the failure diagnosis, is increased when the second power shut-off circuit is subjected to the failure diagnosis.

7. The electric power steering system according to claim 5, wherein:
the failure diagnosis section performs the failure diagnosis at a predetermined time interval.

* * * * *